March 11, 1941. B. N. WALLIS 2,234,906
METHOD OF DETERMINING THE FORM AND CONTROLLING THE PRODUCTION OF GEODESICS
Filed Oct. 31, 1938 4 Sheets-Sheet 1

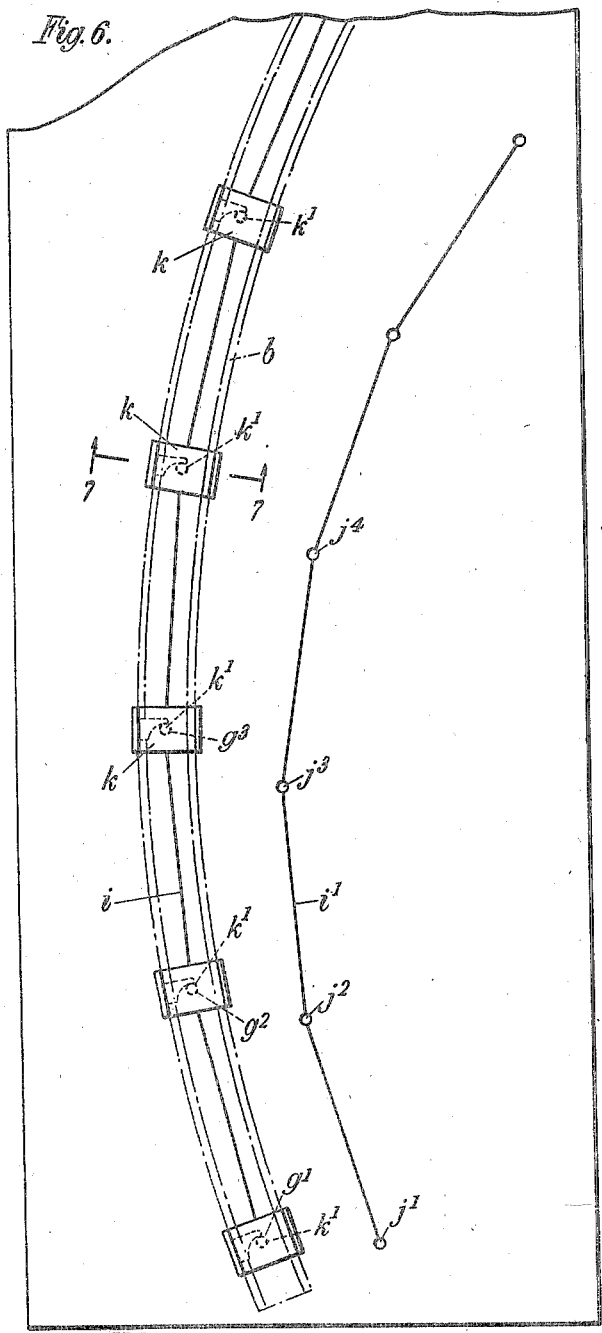

Patented Mar. 11, 1941

2,234,906

UNITED STATES PATENT OFFICE 2,234,906

METHOD OF DETERMINING THE FORM AND CONTROLLING THE PRODUCTION OF GEODESICS

Barnes Neville Wallis, Weybridge, England, assignor, by mesne assignments, to Vickers-Armstrongs Limited, Westminster, London, England Application October 31, 1938, Serial No. 237,988
In Great Britain November 8, 1937

6 Claims. (Cl. 29—148)

This invention relates to a method of determining the form, and controlling the operations involved in the production, of geodesics to be used in the building of geodetic structures, as described in U. S. Patents Nos. 1,894,104, 1,985,649 and 2,060,387 and application Serial No. 201,811, and it has for its object so to determine or control the various shop processes, such as forming, drilling and slotting, as to enable the geodesics to be mass produced with a high degree of accuracy and generally in such a manner that the required structure can be built by merely assembling the preformed structural elements and fixing them together.

Difficulties arise in mass producing geodesics and particularly geodesics for tapered or other irregular aircraft bodies because the form of the geodesic and its points of intersection with other geodesics will vary with the change in shape or size of the aircraft body.

In said geodetic structures, the geodesics intersect each other, necessitating the slotting of them at each point of intersection in order that they may fit into each other and the geodesics are also attached together at the points of intersection necessitating the formation of holes in them near each point of intersection for attachment of connecting plates or other members by which the geodesics can be so attached together. The points of intersection constitute nodes in the geodetic structure.

It will be understood that by mathematical analysis the whole torsion of a twisted geodesic can be determined, disclosing the curvature of the member when untwisted and lying in one plane.

The method according to this invention is then to ascertain the lengths of the chords of the neutral axis of the geodesic from each node to the next and also the angular relationship of the said chords to each other when untwisted and lying in a common plane and these linear and angular measurements are used to set out the nodal points on a plate in which locating means, such as holes, made at the nodal points, mark the points and form a template for use as a guide in forming the structural element which is to constitute the geodetic member. The template also serves to receive jigs or other fittings adapted to hold the structural element while holes and slots are formed in it, which holes and slots are required to enable the said element to intersect with and be rigidly connected to other structural elements at each nodal point. Finally the elements are removed and assembled with other elements similarly formed and the act of assembling and attaching them together causes them to take the required geodetic form.

In order that this invention may be readily understood and carried into practice, it will now be more particularly described with reference to the accompanying drawings, in which:

Fig. 4 illustrates a convenient form of scaling device.

Fig. 6 is a similar view to Fig. 5 showing the fittings for one structural element applied to the template and holding the structural element in position on said template.

Fig. 7 is a section on the line 7—7 in Fig. 6 showing the form of the fitting attached to the plate and holding the structural element thereon.

Fig. 8 is a section through the scaling device and template, showing how the scaling device is located on the template.

Figure 1:
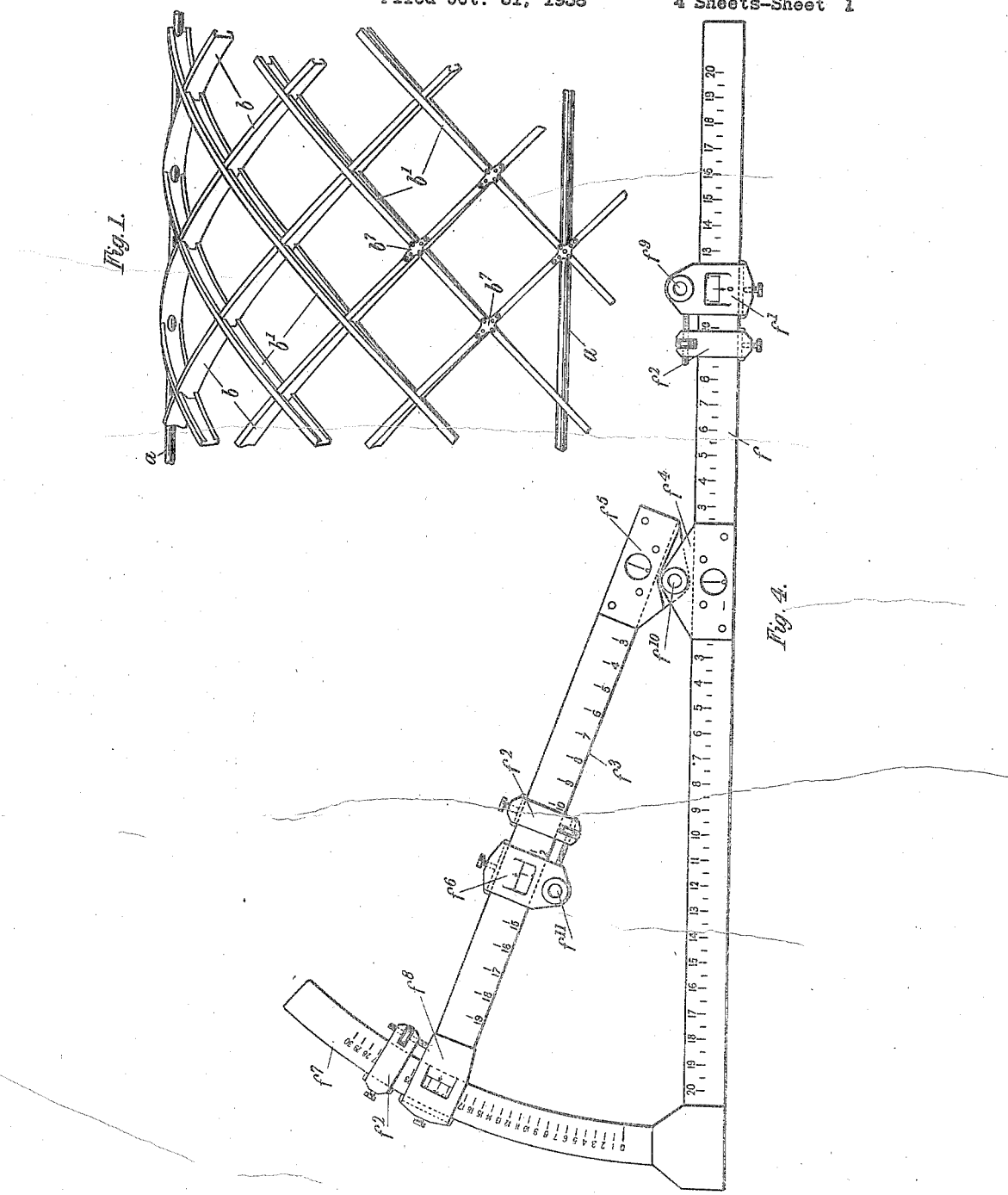
Fig. 1 is an elevation of a part of a geodetic structure.
Figure 2:
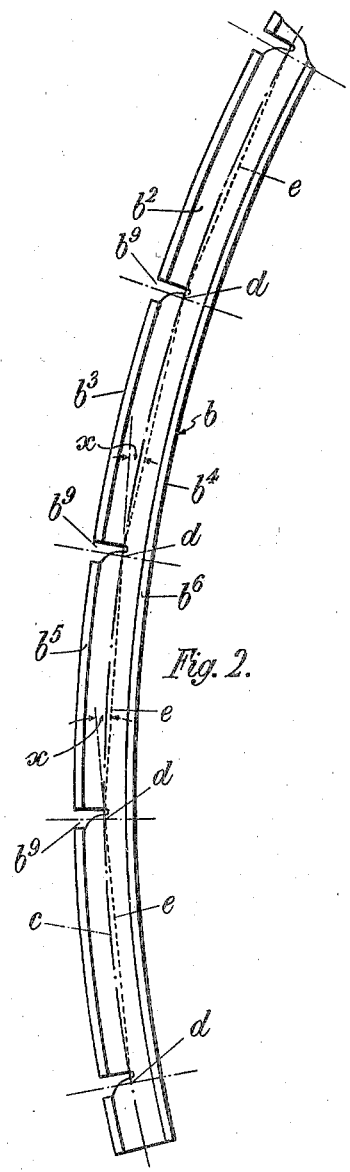
Fig. 2 is a side view of one of the structural elements in its untwisted condition showing how this is formed, slotted and drilled.
Figure 3:
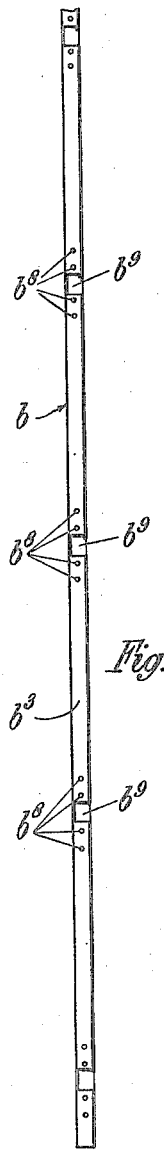
Fig. 3 is an edge view of the structural element shown in Fig. 2.

Assuming that it is desired to mass produce the geodetic members of the structure shown, by way of example, in Fig. 1 and comprising longitudinal members $a$ braced by two series of geodetic members $b$ and $b^1$. The geodetic members are each made of sheet metal bent up to channel cross-section having a web $b^2$, flanges $b^3$, $b^4$ and inturned edges $b^5$, $b^6$. Each of these members before its assembly to form the structure comprises the channel element shown in Figs. 2 and 3 having its web flat in one plane, the element being, as shown, curved to suit the contour of the structure. When assembling such an element with others to form the structure, the elements have to intersect each other and be rigidly connected up at each intersection by fittings, such as the bridge plates $b^7$. The points of intersection of the neutral axis $c$ of one element with another, indicated by the chain dotted lines, constitute node points. These node points are marked $d$ in Fig. 2. The positions of these node points can be determined by measuring the length of each of the chords $e$ of the element represented by the dotted line and the angle $x$ of one chord to the next chord.

Having ascertained the lengths of the chords and their angular relationship one to another, the scaling device illustrated in Fig. 4 is used to set out the nodal points on a plate as will be hereinafter explained. The scaling device comprises a main scale bar $f$ having a slide $f^1$ preferably formed with a vernier scale (not shown) and having a fine setting attachment $f^2$, and a secondary scale bar $f^3$ pivotally mounted on the main scale bar by brackets $f^4$, $f^5$ so fixed that the pivot is located opposite the zero mark of each scale. This secondary scale bar has a slide $f^6$ similar in all respects to the slide $f^1$. The main scale bar is formed at its left hand end with a protractor extension $f^7$, having a further slide $f^8$ thereon to which is attached the end of the secondary scale bar $f^3$. The slide $f^8$ is similar to that marked $f^1$ and the slides $f^1$, $f^6$ and the brackets $f^4$, $f^5$ are formed with holes $f^9$, $f^{10}$ and $f^{11}$ arranged to form drilling jigs.

Figure 5:
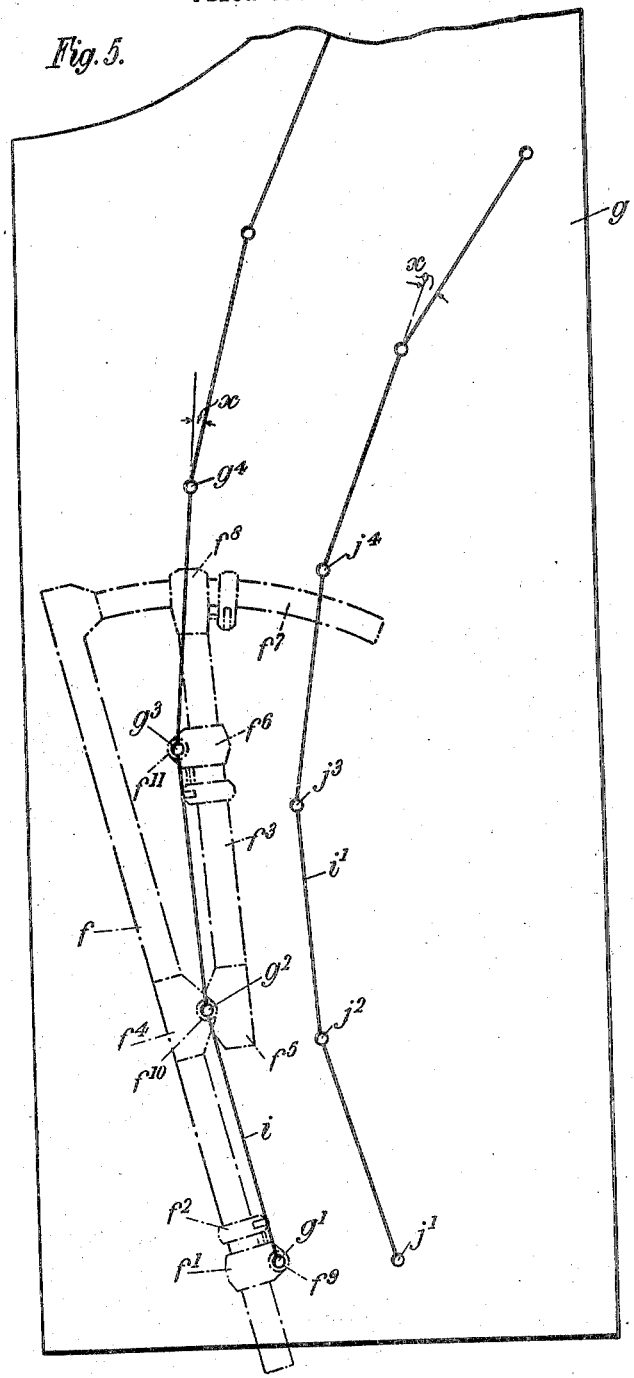
Fig. 5 is a face view of the template and illustrating how the scaling device is used to locate the positions of the holes formed in the plate.

In use the scaling device is laid in any suitable position on a plate $g$, for instance as shown in Fig. 5 and the slide $f^1$ on the main scale $f$ of the scaling device is adjusted to the first linear chord measurement and then, by using the holes $f^9$, $f^{10}$ as drilling jigs, two holes $g^1$, $g^2$ are drilled in the plate and in the positions so determined to constitute the first and second nodal points. Now while the scaling device is held in this position, which is conveniently effected by inserting the plugs $h$ shown in Fig. 8 through each pair of superposed holes $f^9$, $g^1$ and $f^{10}$, $g^2$, a secondary scale $f^3$ associated with the protractor $f^7$ is moved to the angular measurement of the second chord relative to the first chord and the second scale is fixed at the required angle. The slide $f^6$ on the second scale is then set to the length of the second chord and a hole $g^3$ forming a third nodal point is drilled in the plate using the hole $f^{11}$ in the slide $f^6$ as a drilling jig. Now the main scale is moved to bring the hole $f^9$ above the hole $g^2$ and the hole $f^{10}$ above the hole $g^3$ where it is fixed by the plugs $h$ as before, after which the secondary scale $f^3$ is adjusted angularly to the predetermined angle of the third chord relative to the second chord and again fixed. The secondary scale slide $f^6$ is then set to the length of the third chord and a hole $g^4$ to form the fourth nodal point is drilled as before. This is repeated for each additional chord and thus the drilled plate is formed into a template having a series of holes located at the nodal points of the required form of geodesic.

The nodal points for a number of geodesics may be formed on each plate, the holes for the respective geodesics being distinguished from each other by joining them by lines marked $i$ and $i^1$ in Figs. 5 and 6 which may be coloured or otherwise distinguished from each other. Moreover, by superposing a number of plates and drilling through all of them, duplicate templates can be made for use in different sections of the works. In addition, a template made for a right hand geodesic can, by reversing the template plate, be used for a corresponding left hand geodesic.

The template so produced can be used to determine the curved form to which a strip of metal is rolled, or drawn, for instance as regards rolling, by arranging that the rolls through which the blank strip passes will take up positions corresponding to the nodal points in the template. Another use for the template is that by fitting channel-shaped jigs as shown in Figs. 6 and 7 and marked $k$ to the template by engaging studs $k^1$ on the back of them in the holes $g^1$, $g^2$, etc., in the template, and fitting the bent strip to the jigs so positioned, the form of the curved strip can be checked. Further by suitably forming the jigs $k$ as indicated in dotted lines in Fig. 6 to serve as drilling and slotting jigs, the strip can be drilled, for example with holes $b^8$, and slotted, for example with slots $b^9$ which are accurately located and the preformed structural element so obtained can, without any fitting operations, be assembled by unskilled or semi-skilled labour to form a geodetic panel which, after being covered, can likewise be assembled with spars or other members to form the complete structure.

To enable the holes to be drilled easily in the template, a drill mounted on three legs having electro-magnetic shoes may be used which can be readily moved to, and speedily and firmly held at, the required position by the magnetic shoes, while the drill is fed. The drill will preferably be electrically driven and arranged so that the feet are only energised when the drill is being driven.

What I claim as my invention and desire to secure by Letters Patent is:

1. A method of producing a template for use in making a geodetic structure having two series of geodetic members extending in geodetic lines and intersecting each other at points which constitute nodes in the structure, which consists in ascertaining the length of each chord of the neutral axis of the required geodesic from one node to the next and the angular relationship of the chords to each other when untwisted and lying in a common plane, setting out the nodal points on a plate by using the ascertained linear and angular measurements, forming locating means on the plate at the nodal points and mounting on the plate at the points defined by said locating means fittings shaped to receive the structural elements which are to form the geodetic members and adapted to maintain them in correct position relatively to the plate, said plate and fittings constituting the required template.

2. A method of producing a template for use in making a geodetic structure having two series of geodetic members extending in geodetic lines and intersecting each other at points which constitute nodes in the structure, which consists in ascertaining the length of each chord of the neutral axis of the required geodesic from one node to the next and the angular relationship of the chords to each other when untwisted and lying in a common plane, setting out the nodal points on a plate in accordance with the ascertained liner and angular measurements, forming locating holes in the plate at the nodal points and mounting fittings in the said holes in the said plate, which fittings are shaped to receive the structural elements which are to form the geodetic members and are adapted to maintain them in correct position relatively to the plate, said plate and fittings constituting the required template.

3. A method of producing a template for use in making a geodetic structure having two series of geodetic members extending in geodetic lines and intersecting each other at points which constitute nodes in the structure, which consists in ascertaining the length of each chord of the neutral axis of the required geodesic from one node to the next and the angular relationship of the chords to each other when untwisted and lying in a common plane, applying to a plate a drilling jig incorporating two scales pivoted together at their zero points and having a protractor whereby the scales can be set at an angle corresponding to that of the ascertained angular relationship of the said chords to each other, said scales having drill guiding means at the pivot point and having drill guiding means on slides arranged one on each of the said scales, adjusting said scales to the ascertained angular relationship of the adjacent chords and adjusting said slides to the ascertained lengths of the chords, drilling holes in the plate in positions determined by said drilling jig, removing said jig and applying fittings to the drilled holes in the said plate, which fittings are shaped to receive a predetermined shape of structural element, said plate and fittings constituting the required template.

4. The herein described method of producing a template for a geodetic structure in which two series of structural members extend in geodetic lines and intersect each other at points which constitute nodes in the structure, which consists in ascertaining the length of each chord of the neutral axis of the required geodesic from one node to the next and the angular relationship of the chords to each other when untwisted and lying in a common plane, applying the linear and angular measurements to a plate to form nodal points on the said plate, mounting on the plate at each of the nodal points a structure holding fitting, which plate and fittings constitute the required template with the fittings serving to hold the structural members against movement relatively to the plate.

5. A method of making a geodetic structure comprising two series of geodetic members extending in geodetic lines and intersecting each other at points which constitute nodes in the structure, which consists in bending the structural elements which are to constitute the geodetic members to the proper curvature in one plane, determining on each of said curved but untwisted elements a series of points which will become nodes when the element is twisted into geodetic form, slotting said elements at said points, and finally assembling said elements, by twisting them until their respective slotted portions cooperate and thereby bringing them to the required geodetic form, and uniting them together at the nodes.

6. A method of making a geodetic structure comprising two series of geodetic members extending in geodetic lines and intersecting each other at points which constitute nodes in the structure and bridge members connecting the geodetic members at the nodes, which consists in bending the structural elements which are to constitute the geodetic members to the proper curvature in one plane, determining on each of said curved but untwisted elements a series of points which will become nodes when the element is twisted into geodetic form, drilling and slotting said elements at said points, and finally assembling said elements, by twisting them until their respective slotted portions cooperate and thereby bringing them to the required geodetic form, and uniting them together and to the bridge members at the nodes.

BARNES NEVILLE WALLIS.